United States Patent
Bogoni et al.

(10) Patent No.: US 8,514,115 B2
(45) Date of Patent: Aug. 20, 2013

(54) OPTICAL ANALOGUE TO DIGITAL CONVERTER

(75) Inventors: Antonella Bogoni, Mantova (IT); Francesco Fresi, Parma (IT); Emma Lazzeri, Arcola (IT); Mirco Scaffardi, Parma (IT); Luca Poti, Pisa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 7 days.

(21) Appl. No.: 13/127,085

(22) PCT Filed: Oct. 31, 2008

(86) PCT No.: PCT/EP2008/064789
§ 371 (c)(1),
(2), (4) Date: Jun. 8, 2011

(87) PCT Pub. No.: WO2010/049001
PCT Pub. Date: May 6, 2010

(65) Prior Publication Data
US 2011/0234436 A1    Sep. 29, 2011

(51) Int. Cl.
*H03M 1/00* (2006.01)
(52) U.S. Cl.
USPC .......................................... 341/137; 341/155
(58) Field of Classification Search
USPC .................................................. 341/137, 155
See application file for complete search history.

(56) References Cited

U.S. PATENT DOCUMENTS

| | | | |
|---|---|---|---|
| 4,712,089 A * | 12/1987 | Verber | 341/137 |
| 4,926,177 A | 5/1990 | Sakata | |
| 6,700,517 B1 | 3/2004 | Kellar | |
| 7,403,142 B2 * | 7/2008 | Hirono et al. | 341/137 |

OTHER PUBLICATIONS

Ikeda, K. et al., "Design Considerations of All-Optical A/D Conversion: Nonlinear Fiber-Optic Sagnac-Loop Interferometer-Based Optical Quantizing and Coding", Journal of Lightwave Technology, vol. 24, No. 7, (Jul. 2006), pp. 2618-2628.
Scaffardi, M. et al., "Photonic Processing for Digital Comparison and Full Addition Based on Semiconductor Optical Amplifiers", IEEE Journal of Selected Topics in Quantum Electronics, vol. 14, No. 3, (May 1, 2008), pp. 826-833.
International Search Report for PCT/EP2008/064789, mailed Sep. 8, 2009.
Brzozowski, L. et al., "All-Optical Analog-To-Digital Converters, Hardlimiters, and Logic Gates", Journal of Lighwave Technology, vol. 19, No. 1, (Jan. 1, 2001), pp. 114-119.

(Continued)

*Primary Examiner* — Khai M Nguyen
(74) *Attorney, Agent, or Firm* — Nixon & Vanderhye, P.C.

(57) ABSTRACT

An analogue to digital converter is arranged to receive and process an analogue optical input signal to produce an N bit digital optical output signal quantised to $2^N$ levels, where N is greater than or equal to 2. The converter has an input for receiving the optical input signal and N processing channels which are each coupled to the input, at least one of said processing channels comprising an optical processing circuit arranged to generate a plurality of digital optical output signals. The optical processing circuit is arranged to change the state of each digital optical output signal corresponding to a respective different value of the analogue optical input signal, and an optical combining circuit for combining the optical output signals in order to generate one bit of the N-bit digital optical signal.

21 Claims, 10 Drawing Sheets

(56) References Cited

OTHER PUBLICATIONS

Rostami, A, et al., "Full Optical Analog to Digital (A/D) Converter Based on Kerr-like Nonlinear Ring Resonator", Optics Communications, vol. 228, No. 1-3, (Dec. 1, 2003), pp. 39-48.

Nishitani, T. et al., "Optical Coding Scheme Using Optical Interconnection for High Sampling Rate and High Resolution Photonic Analog-to-Digital Conversion", Optics Express Nov. 26, 2007 Optical Society of America, vol. 15, No. 24, (Nov. 26, 2007), pp. 15812-15817.

Scaffardi, M. et al., "Analog-To-Digital Conversion Based on Modular Blocks Exploiting Cross-Gain Modulation in Semiconductor Optical Amplifiers", IEEE Photonics Technology Letters, vol. 21, No. 8, (Apr. 15, 2009), pp. 540-542.

Scaffardi, M. et al., "Analog-to-Digital Conversion Exploiting XGM in SOA-Based Modular Blocks", IEEE Lasers and Elecro-Optics Society, 2008. LEOS 2008, (Nov. 9, 2008), pp. 735-736.

\* cited by examiner

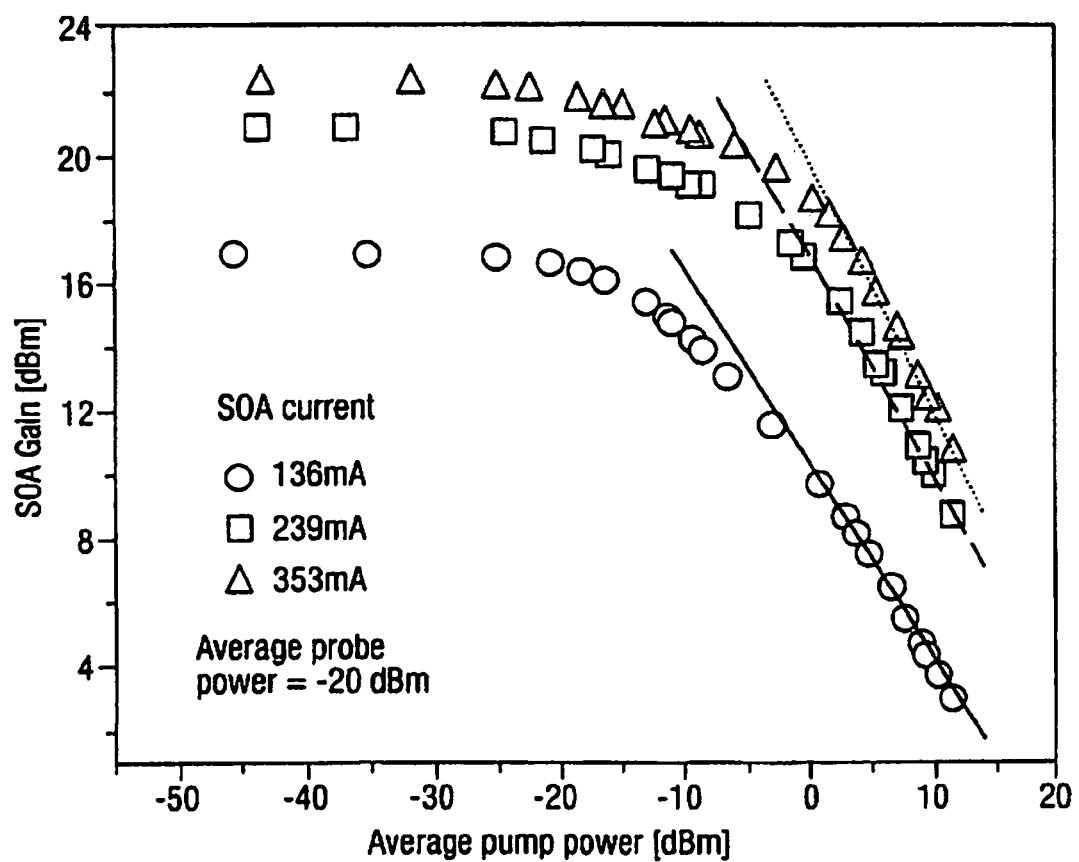

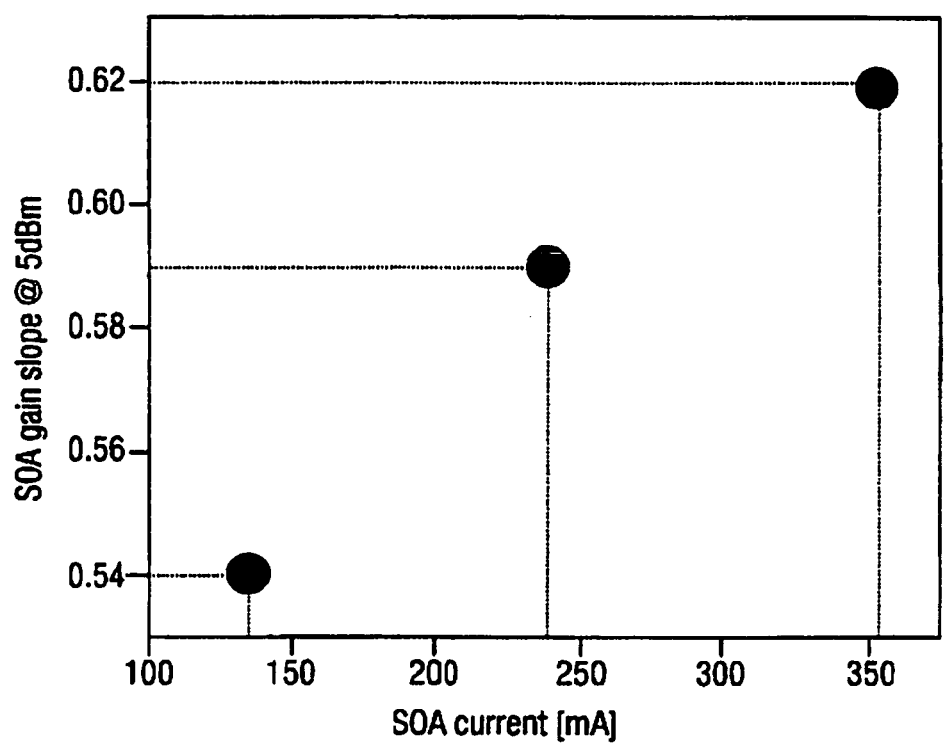

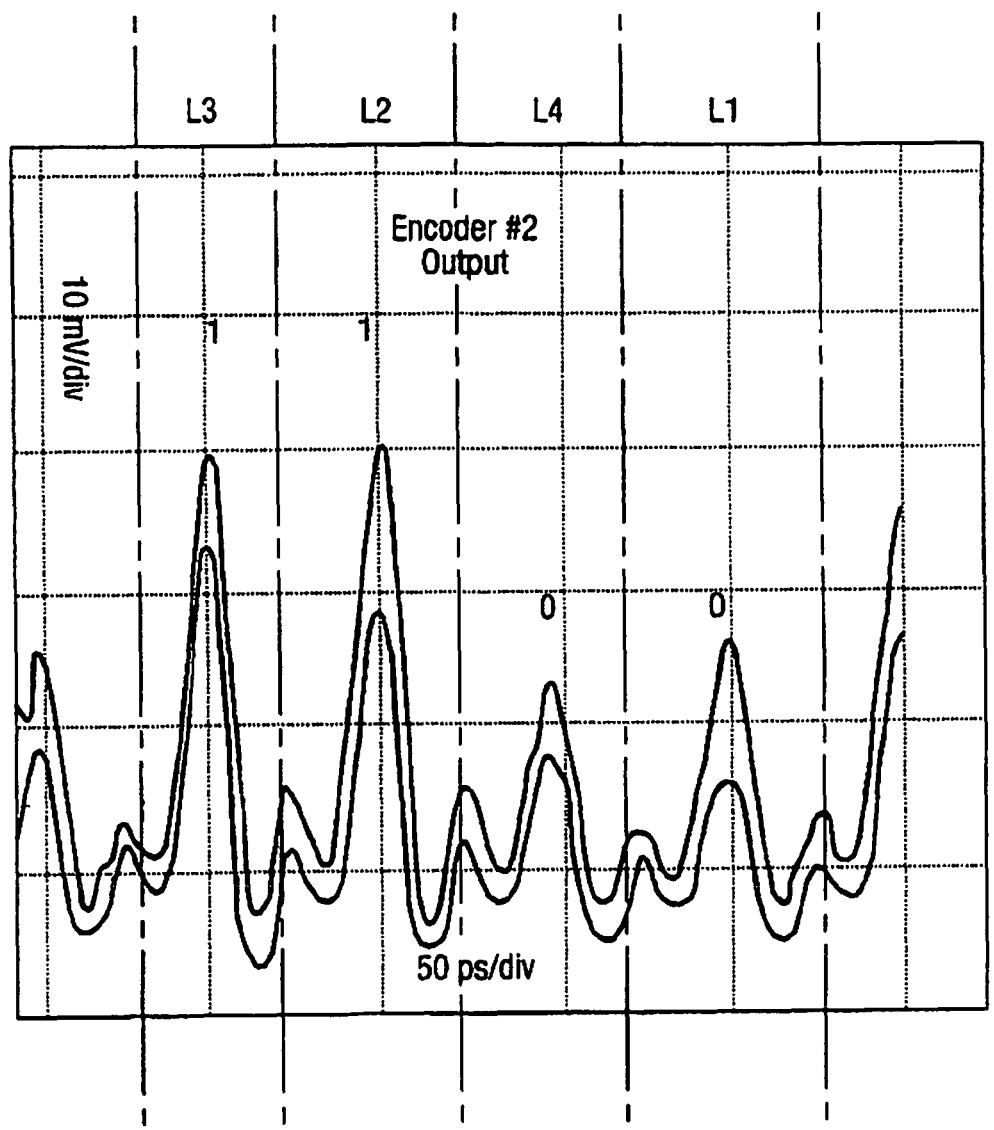

OPTICAL ANALOGUE TO DIGITAL CONVERTER

This application is the U.S. national phase of International Application No. PCT/EP2008/064789, filed 31 Oct. 2008, which designated the U.S., the entire content of which is hereby incorporated by reference.

TECHNICAL FIELD

This invention relates to optical analogue to digital converters.

BACKGROUND

All-optical quantising and coding are key functionalities enabling all-optical analogue-to-digital conversion and multilevel-to-binary conversion. An optical analogue to digital converter takes at its input an optical input signal which has a time varying intensity (such as a train of optical pulses of differing intensity levels) with the intensity encoding information and produces at its output an optical digital representation of the input signal, such as a train of digital values corresponding to the input pulse train. This output signal may be encoded in a variety of ways, including binary encoding, Gray scale and two's complement binary. The common link is that each encoding level or "bit" of the output signal is digital and may therefore have only one of two optical states—a low state and a high state. Typically the low state is defined as zero intensity and the high state as some non-zero intensity.

We are aware of a previous attempt at providing an optical analogue to digital converter described in the paper Design Considerations of All-Optical A/D conversion: Non-linear Fiber-Optic Sagnac-Loop Interferometer based Optical Quantizing and coding of Kensuke Ikeda et al, Journal of Lightwave Technology, Vol. 24, No. 7, July 2006. In that paper Quantising and coding is achieved by exploiting the nonlinear optical loop mirrors (NOLMs) characteristic. Specifically the ability of such NOLMS to exhibit more than one transition from a low state to a high state and back to a low state was proposed as the mechanism for providing the required output value for each bit of a 2 bit output signal. However, a problem with the use of NOLMS foreseen by the author of that paper was that the power levels needed at the input for a practical system with more than 2 bits of output are excessive making it unsuitable for many applications, if indeed it could be realised at all.

SUMMARY

According to a first aspect the invention provides an analogue to digital converter arranged to receive and process an analogue optical input signal to produce an N bit digital optical output signal quantised to $2^N$ levels, where N is greater than or equal to 2, the converter having:

an input for receiving the optical input signal;

N processing channels which are each coupled to the input, at least one of said processing channels comprising a non-linear optical processing circuit arranged to generate a plurality of digital optical output signals dependent upon different values of the analogue optical input signal using respective different non-linear transfer functions, and an optical combining circuit for combining the optical output signals in order to generate one bit of the N-bit digital optical signal.

Preferably the processing means of said at least one processing channel comprises a plurality of optical sub-circuits which are each arranged to receive at an input an optical signal dependent upon the analogue optical input signal and to provide at an output one of said plurality of digital optical output signals, each sub-circuit including an optical device having a transfer function that defines a non-linear relationship between the input signal intensity and the gain of the device such that the optical device is arranged to change the state of the digital output signal from the device when the input signal reaches a threshold intensity.

By using within each processing channel an optical processing circuit which comprises one or more non-linear optical sub-circuits, each having a non-linear optical device with a single threshold, and combining the outputs of these devices using all optical logic elements where needed, an apparatus which can be manufactured simply and in large scale is provided. By providing optical processing circuits (and sub-circuits) and optical combining circuits which work entirely in the optical domain the converter can process very high bandwidth optical input signals by suitable selection of components.

For the avoidance of doubt, it should be understood that the term optical circuit or sub-circuit refers to a circuit which receives one or more optical signals and outputs one or more optical signals with any processing of the signals performed by the circuit being entirely in the optical domain. Also, the term non-linear transfer function in this context means that the circuit (or sub-circuit) provides a non-linear relationship between the intensity of any input signal and the intensity of any corresponding output signal. This non-linearity could be achieved using an optical device which exhibits a non-linear optical effect An optical splitter may be provided which is arranged to receive the optical input signal from the input and splits the input signal into N optical sub-signals, each of the N processing channels being coupled to a respective one of the N processing channels.

The input signal threshold required to cause the output of each optical sub-circuit to change state may be determined by the attenuation level of an attenuator provided upstream of the optical device. In this way, optical devices which need the same input signal power to switch output state can be used, with the input signal being scaled up or down before entering the optical device.

Additionally or alternatively it may be determined by selection of a different threshold level for each optical device which determines the level of input signal required to exceed the threshold. For example, in a most preferred arrangement each optical sub-circuit may include an optical device that comprises a semiconductor optical amplifier with a threshold determined by an electrical current. Applying different levels of current changes the input signal power required to saturate the amplifier and hence changes its gain as a function of input signal power.

In one advantageous arrangement an optical sub-circuit may comprise a semiconductor optical amplifier configured so that a first end of the semiconductor optical amplifier is fed with a pump signal comprising the optical input signal, a second end of the semiconductor optical amplifier is fed with a probe signal comprising a clock signal, and the digital output of the device comprises a signal output from the first end of the semiconductor optical amplifier. Optionally, an additional common wave signal input may be input to the second end of the semiconductor optical amplifier.

In a still further additional or alternative arrangement the converter may be arranged to combine an additional optical signal with the input signal (which may optionally have been attenuated or boosted) and the combined signal applied to the optical device of the optical sub-circuit. This additional signal can be used to bias the input signal fed to the optical device to a chosen level relative to the threshold. Thus the threshold of the optical device could remain the same but the threshold of the whole circuit will change.

Most preferably the optical processing circuit of each processing channel comprises $2^N/2$ optical sub-circuits which each include an optical device, each sub-circuit arranged to provide at an output a digital optical output signal, each sub-circuit having a non-linear relationship between the input signal intensity and output signal intensity such that the sub-circuit has a threshold at which the digital output signal from that device changes state, each optical sub-circuit of a processing channel having a different threshold to any other optical sub-circuits in that processing channel.

A said processing channel may have at least one pair of said optical sub-circuits, each sub-circuit being connected to the input signal.

A processing channel corresponding to the most significant bit of the output signal may comprise a single optical sub-circuit arranged to provide at an output a digital optical output signal and having a non-linear relationship between the input signal intensity and gain of the optical sub-circuit such that the sub-circuit has a threshold at which the digital output signal from that device changes state.

At least one of said processing channels includes two or more pairs of optical sub-circuits, each having a different switching threshold T3,T1,T7,T5, each threshold corresponding to a different intensity level of the analogue input signal at which the output signal of the processing channel changes state, the output signals from each pair being input to the optical combining circuit which comprises at least two optical logic elements, each receiving the output from one of the pairs, and at least one further logic element (304) which is arranged to receive at an input the output of two of the logic elements.

Where an optical combining circuit is provided, the or each optical logic element may comprise an optical AND, NAND, OR, NOR and NOT element each formed from at least one semiconductor optical amplifier.

In a specific advantageous arrangement of the invention an analogue to digital converter may be provided which is arranged to produce a three bit digital optical output signal and comprises three processing channels, in which the processing channels comprise:

a first processing channel having an optical processing circuit comprising one optical sub-circuit whose output corresponds to the most significant bit of the output signal, a second processing channel having an optical processing circuit comprising two optical sub-circuits, each having different thresholds, and both outputting an optical signal which is passed to a respective input of an optical combining circuit comprising an optical logic gate, the output of the logic gate corresponding to the next most significant bit of the output signal, and a third processing channel having an optical processing circuit comprising two pairs of optical sub-circuits, each having a different threshold, and the output of both pairs being passed to an optical combining circuit which comprises a pair of optical logic gates, each connected to the outputs of a respective one of the two pairs of optical sub-circuits, the combining circuit further comprising an OR gate which combines the output of the two logic gates, the output of the OR gate corresponding to the least significant bit of the digital output signal.

The present invention may be configured to provide a digital output signal which is encoded in twos complement binary or gray scale coding of the analogue optical input signal or any other preferred coding scheme. Due to the all optical nature of the converter it is envisaged that it may be especially suitable for use in high speed optical networks such as communications networks.

According to a second aspect the invention provides a method of processing an analogue optical signal to generate an N-bit digital optical signal, the method comprising:

optically processing in N processing channels a respective input signal dependent on the analogue optical input signal, generating within each processing channel a plurality of digital optical output signals dependent on respective different values of the analogue optical signal using different non-linear transfer functions; and combining predetermined groups of the optical output signals in order to generate respective bits of the N-bit digital optical signal.

It will be appreciated that protection may be sought for other method steps which correspond to the function of the apparatus of the first aspect of the invention.

BRIEF DESCRIPTION OF THE DRAWINGS

There will now be described, by way of example only, one embodiment of the present invention with reference to and as illustrated in the accompanying drawings of which:

FIG. 5(a) shows the gain of the amplifier of the circuit of FIG. 4 against average optical input signal power for different current levels;

FIG. 5(b) shows the change in the slope of the gain curve as a function of current demonstrating how the threshold of the device can be altered dependent upon the level of current applied;

FIGS. 6(a) to (d) show measurement results obtained from an experimental implementation of two bits of a 3 bit optical to digital converter constructed according to FIGS. 2 to 4; and

DETAILED DESCRIPTION

Figure 1:
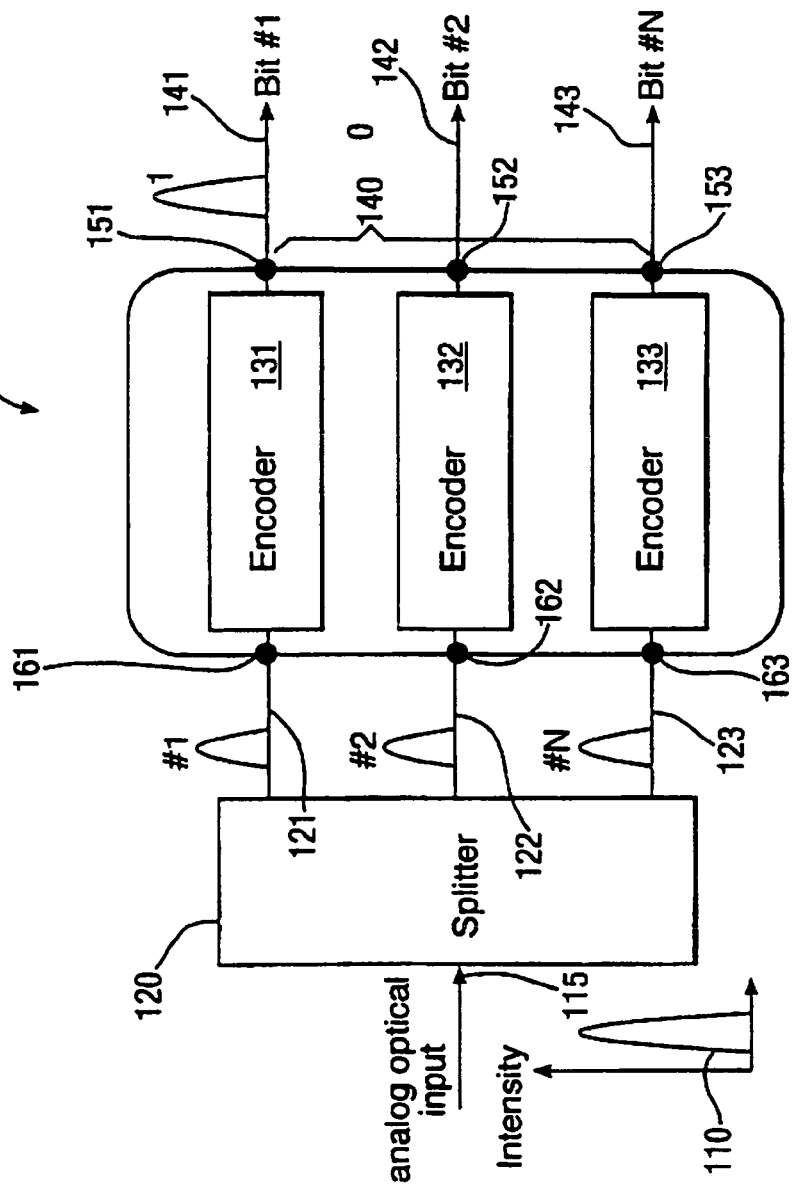
FIG. 1 is schematic representation of an embodiment of an N bit all optical analogue to digital converter according to the present invention.
Figure 2:
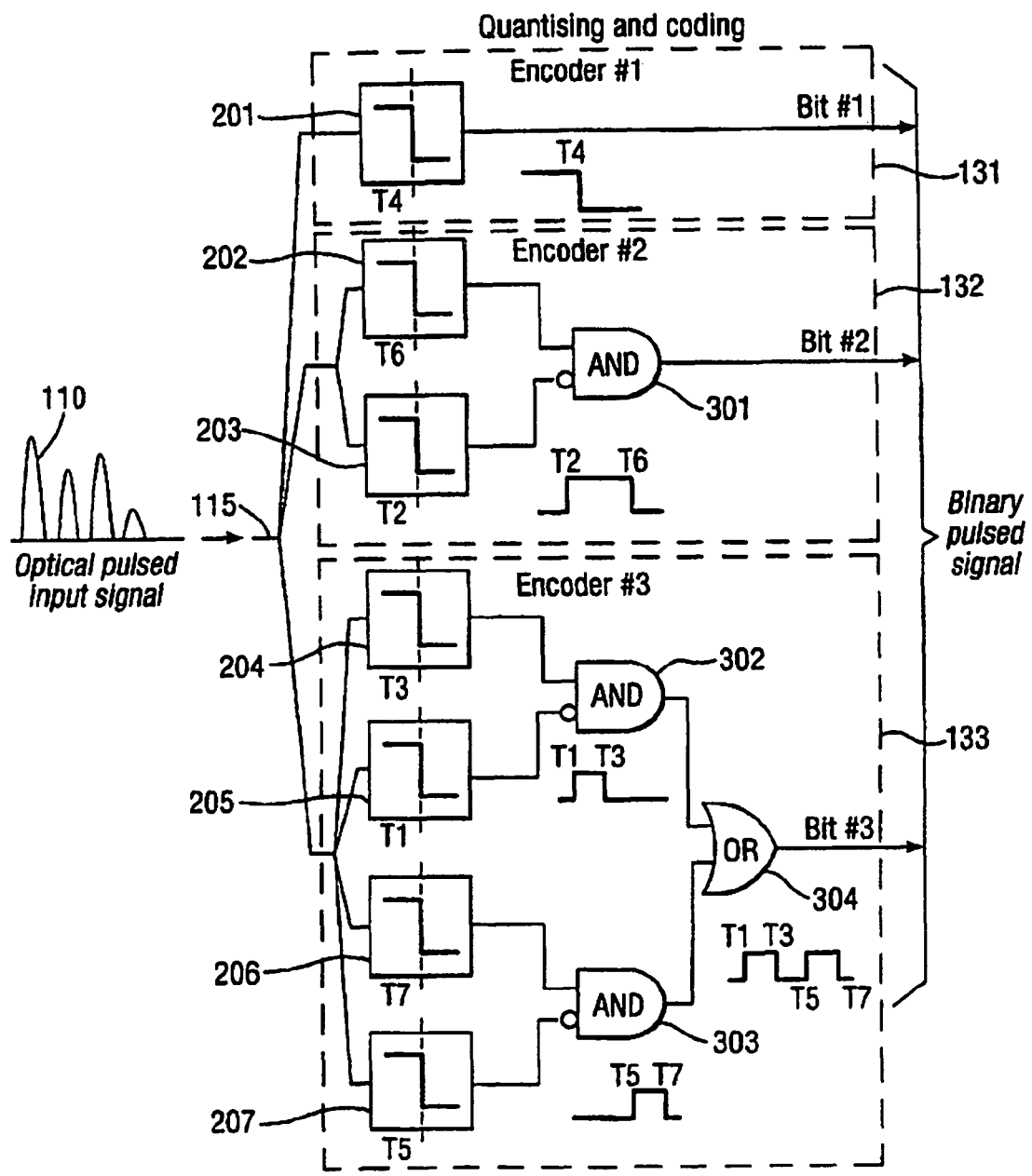
FIG. 2 is a more detailed schematic of a 3 bit converter constructed in accordance with the principles shown in FIG. 1.

FIG. 1 is a schematic overview of an N-bit all optical to digital converter whose construction falls within the scope of the present invention. The converter is fully scalable although in practice the most likely implementations will be for values of N in the range 3 to 8 where such converters will find widespread application in optical telecommunications. A defined example of a 3 bit converter (N equals 3) within the scope of the invention is shown in FIG. 2 of the accompanying drawings. The converter takes as its input a pulsed optical input signal whose intensity level L varies with time (e.g. each pulse may have a different intensity). For each applied pulse the converter provides at its output three parallel optical signals, each having either a high level representing a digital one, or a low value representing a digital zero. The three parallel values encode the intensity level of the input signal with a unique combination of ones and zeros for each level of input signal over a preset range.

The pattern of ones and zeros in the three output signals is set by a truth table and can represent a binary coding, Gray scale coding or other coding of the input signal.

The converter in its most basic form comprises an input (115) for receiving the optical input signal (110) and N processing channels (131,132,133) which are each coupled to the input. At least one of said processing channels comprises an optical processing circuit (201,202,203, 204,205, 206,207) arranged to generate a plurality of digital optical output signals, the optical processing circuit being arranged to change the output state of each output signal corresponding to a respective different value of the analogue optical signal. An optical combining circuit (301,302,303,304) is also provided in the at least one channel for combining the optical output signals in order to generate one bit of the N-bit digital optical signal. Both the optical processing circuit and combining circuit are all optical by which we mean optical signals enter in the optical domain, are processed in the optical domain, and are output as optical domain signals. At no point are the signal converted to electrical signals.

As shown in FIGS. 1 and 2, in this example each of the processing channels is fed with a respective signal which is obtained by feeding the optical input signal 110 into an optical splitter 120 where it is split into three input sub-signals 121,122,123. In this example each of the sub-signals is therefore an exact replica of the others in intensity and shape, being approximately one third the intensity of the input signal. This is not essential and the input signal could be split out into sub-signals of differing intensity provided that the relative intensities across the sub-signals are known.

Figure 3:
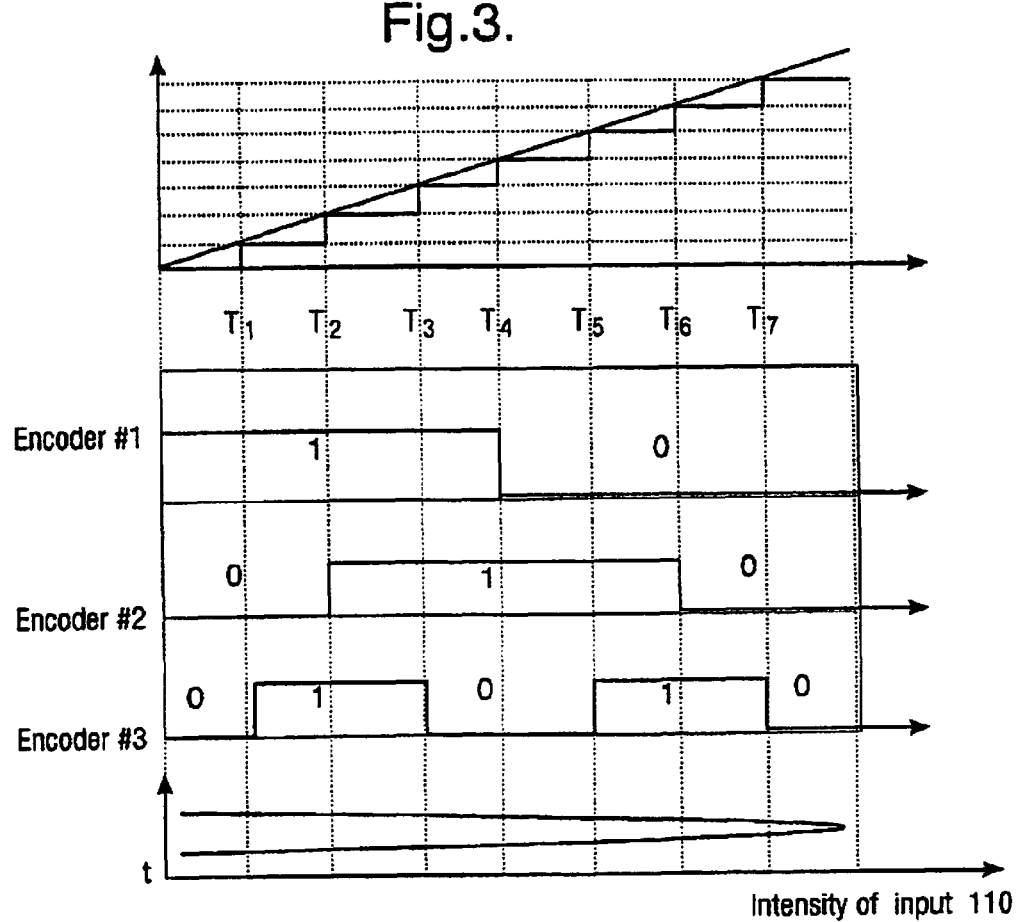
FIG. 3 illustrates the state of each of the 3 output bits of the converter of FIG. 2 for a changing input signal intensity together with a sample digital output corresponding to an input signal with an intensity level L7.

Each of the sub-signals is fed into a respective encoder or processing channel 131,132,133. In this way each processing channel can be considered to be connected to the input optical signal as changes in optical inputs signal will cause corresponding changes to each of the sub-signals. Each channel is associated with a single bit of the output signal in practice this means that each time a bit of the output signal should change level then so will the output of the respective processing channel. This can be seen in FIG. 3.

The required characteristic of each of the processing channels is obtained by providing in that channel an optical processing circuitry and, in some channels, an optical combining circuit. The optical processing circuit comprises one or more optical sub-circuits which each comprise a single nonlinear optical device that has a single threshold T. Where a channel includes more than one optical sub-circuit the outputs of the sub-circuits are combined by an optical combining circuit which comprises optical logic elements to provide the output bit for that processing channel.

In particular, as shown in FIG. 2, the most significant bit (Bit #1) is encoded by an optical processing circuit that has a single nonlinear device with a step-like characteristic with threshold T4. The sub-signal input to that processing circuit is passed to the input of the device and the output of the device is fed to the output of the processing channel. If the power of the input pulse is less than T4, which is about midway between zero intensity and maximum intensity for the optical input signal, the output of that channel is a logical '1', otherwise it is '0'. The threshold of the processing circuit should therefore be set to match the sub-signal level which corresponds to the input signal L4.

For the remaining two processing channels more than one transition of the output is needed and so the invention provides that each channel includes an optical processing circuit having more than one optical sub-circuit, and hence more than one non-linear device. Each sub-circuit in this embodiment has a different threshold by which we mean that the digital output signal it produces is caused to change states for differing values of the optical input signal. For example Bit #2 is encoded by combining the output from a pair of non-linear devices with thresholds T2 and T6 (T2<T6). The values T2 and T6 are chosen using the same process by which the level of the single device in the most significant bit channel is chosen. The output from the two devices is then passed to an optical combining circuit comprising an optical logical gate which performs a logical AND function, although it is to be noted that one of the outputs of the devices with threshold T2 is inverted before being fed to the AND. In this manner, Bit #2 is '1' only if the input pulse power is between T2 and T6, because a '0' is present at the output of device with threshold T2 and a '1' is at the output of device with threshold T6. Otherwise bit #2 is '0'.

Bit #3 is encoded by combination of an optical processing circuit comprising two such pairs of non-linear devices and an combining circuit comprising an optical AND gate, with thresholds T1, T3, T5 and T7 (T1<T3<T5<T7). The AND between the output of the nonlinear device with thresholds T3 and the inverted output of the nonlinear device with threshold T1 generates a characteristic which gives '1' if the input power is in the range [T1,T3] and '0' otherwise. In the same way the AND between the output of the nonlinear device with thresholds T7 and the inverted output of the nonlinear device with threshold T5 generates a characteristic which gives '1' if the input power is in the range [T5,T7] and '0' otherwise. The output of both AND gates is passed through an optical OR-gate to produce a signal having the whole characteristic of encoder #3.

A converter has been described which employs a set of optical sub-circuits, each including a non-linear device having a single threshold, with the outputs of the devices being combined where appropriate with optical logic elements, has been described. The optical sub-circuits and their non-linear optical devices, could be identical in structure, making large scale manufacture simple and low cost, for example by fabrication of multiple devices on a single piece of silicon wafer, with the only required difference being that they must have the required different thresholds to the optical input signal.

The different thresholds of the optical circuits can be set in several ways, either by altering the way in which the optical device is used or altering the characteristics of the inputs signal applied to the device, for instance attenuating it or boosting it or offsetting the inputs signal by adding a bias as will be explained hereinafter.

Figure 4:
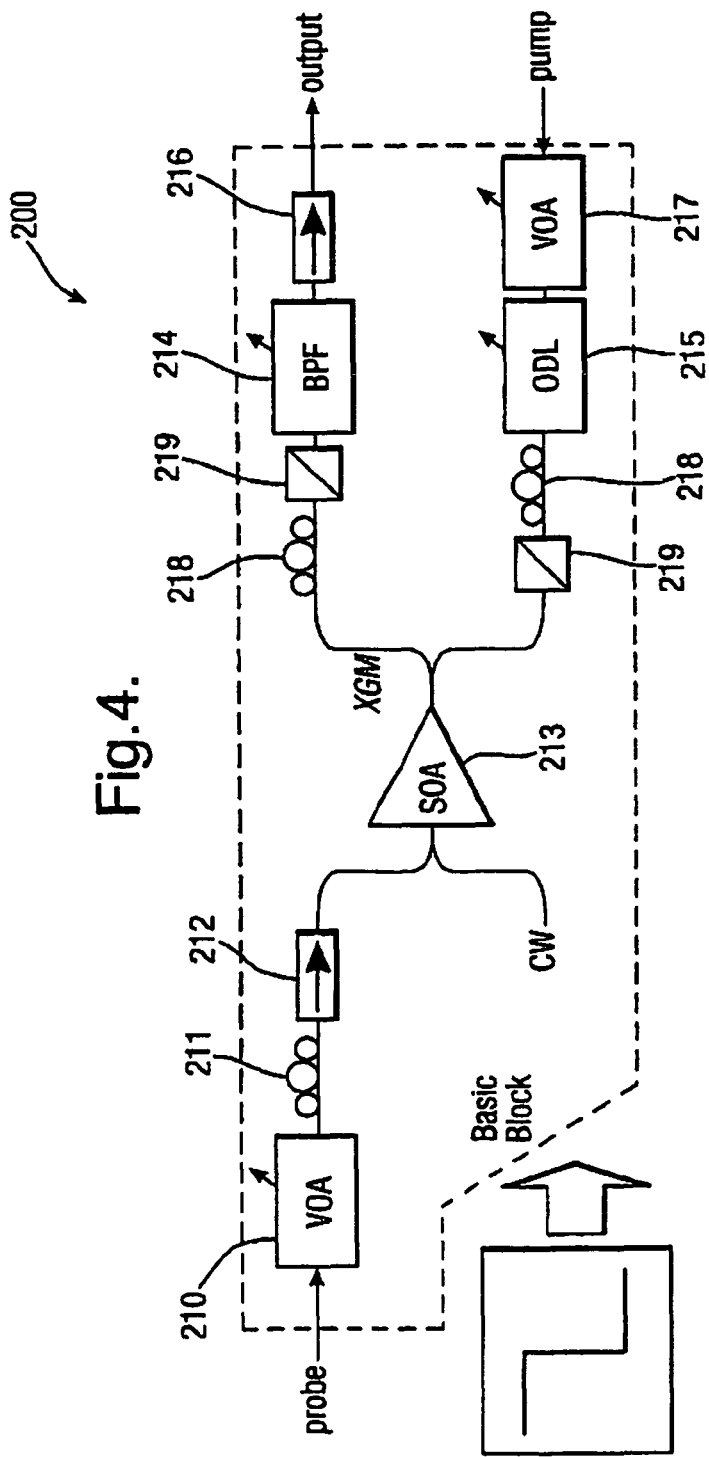
FIG. 4 illustrates an optical circuit which forms a building block of the processing means of each of the processing channels which is based around a single semi-conductor optical amplifier device.

An example of a suitable optical sub-circuit that can be used singly or in multiples to form an optical processing circuit for each channel is shown in FIG. 4 of the accompanying drawings. A semiconductor optical amplifier 213 is used as the non-linear device in each sub-circuit. In the specific example of FIG. 4 each SOA device exploits cross gain modulation XGM to convert an input signal to a clean output signal.

Each semiconductor optical amplifier (SOA) has a first input at one end and a second input at the other. The output from the amplifier is taken to be the signal that passes out of the first end of the amplifier. A characteristic of SOA's is that when a current is applied an optical input signal applied to it will be amplified as long as the intensity of the input signal is below a threshold level. Once the overall intensity of the sum of the input signals exceeds the threshold the gain falls off considerably because the device becomes saturated. The point at which this fall off occurs defines the gain threshold.

The threshold is therefore determined at least in part by the current used to pump the device but also by the sum of any optical input signals applied to the device.

The different thresholds required from each optical circuit constructed as shown in FIG. 4 are achieved at least in part by applying different currents to the SOAs so as to alter the threshold at which gain falls away.

FIG. 5(a) shows the SOA gain for the optical circuit of FIG. 4 v.s. the average optical input signal power for different applied currents of 136 mA, 239 mA and 353 mA. The higher the slope is, the higher the range of variation of the gain, i.e. of the output power, experienced by the input signal. As shown in FIG. 5(b) for a fixed input signal power the slope@5 dBm of the gain curve changes as a function of the SOA current. Thus, identical SOA devices subjected to different applied currents can be used to provide the required differing thresholds.

The threshold, once selected, should be matched to the expected input signal intensity so that the SOA is amplifying for input signal levels below the threshold level and is saturated above that. Whilst this can be partially achieved by setting the current, it is to be understood that it can also be achieved by attenuating or amplifying the input signal prior to entering the SOA to "match" the input to the threshold characteristics of the device. In that way, the input signal can be matched to the fixed threshold. The attenuator or amplifier will therefore form a part of the optical circuit.

It may therefore be possible to provide each SOA with the same threshold and simply attenuate the optical signal fed to each device by different amounts to achieve the desired effect of making the SOA start to saturate at different optical input signal levels. FIG. 4 shows a variable optical attenuator VOA 210 used for that purpose.

A further characteristic is that SOA's are true nonlinear devices, a signal at one wavelength being able to modulate a signal at another or at the same wavelength through the well known process of cross gain modulation (XGM). This can be exploited to provide a device which provided a less noisy output signal than one which is simply fed with an input signal at one end and passes out an output at the other. The example arrangement of FIG. 4 does exploit this characteristic. Arrangements which do not exploit this should be considered to also fall within the scope of the invention and it should be understood that the use of XGM is merely a preferred arrangement.

A further characteristic is that SOA's are true non-linear devices, a signal at one wavelength being able to modulate a signal at another or at the same wavelength through the well known process of cross gain modulation (XGM). This can be exploited to provide a device which provide a less noisy output signal than one which is simply fed with an input signal at one end and passes out an output at the other. The example arrangement of FIG. 4 does exploit this characteristic. Arrangements which do not exploit this should be considered to also fall within the scope of the invention and it should be understood that the use of XGM is merely a preferred arrangement.

The SOA of FIG. 4 is configured as follows. Coupled to a first end of the SOA through a variable optical amplifier 217 and an optical delay line ODL 215 followed by a length of fibre is a relatively high power, pump signal. This pump signal can be solely the optical input signal whose intensity is to set the gain of the SOA, and hence change the output of the SOA as it crosses the threshold. A continuous pump signal can be added to the optical input signal to "tune" the threshold of the SOA. A continuous wave signal CW of relatively high power is coupled to a second end of the SOA. Also coupled to that end through a variable optical amplifier VOA 210, a length of fibre 211 and a unidirectional coupler is a lower power, probe signal which corresponds to a clock signal. This is a periodic clean square waveform which can be synchronised to the input signal pulse train with the clock being in the high state when an input pulse is present and in the low state at all other times. Alternatively the clock signal may be used to sample the analogue input signal at a higher rate than the analogue input signal pulses. The clock may also be synchronised with the clock of any subsequent digital optical circuitry located downstream of the digital output signal.

The probe and the pump signal have the same wavelength but the CW is at a different wavelength. The SOA amplifies the clock signal with a gain that is set by the intensity of the higher power input signal applied to the first end. If the input signal intensity is below the SOA threshold, the SOA applies a high gain to the clock signal and the output of the SOA will be high when the clock is high. If the input signal intensity exceeds the threshold the SOA saturates and the low power clock signal is not amplified. The output signal will then be in a low state.

The use of the CW signal and the counter-propogating input signal contribute to the production of a less noisy output signal than may otherwise be achieved merely by applying the input signal to one end and taking the output signal from the other. The CW signal helps to keep the SOA saturation relatively high, even when the input signal (pump) intensity is low, thus reducing the SOA recovery time.

Thus the nonlinear characteristic of the basic module has a transition from a high level to a low level. At the SOA output a polarisation controller and a polarizer which are shown in FIG. 4 as the two devices 218,219 between the SOA and the BPF or the ODL on the output and pump paths are used to improve the output extinction ratio by taking advantage of the XPM-induced polarisation rotation, the output then being passed through a bandpass filter 214 and unidirectional coupler 216. The threshold of the nonlinear device can be determined by setting the pump power and the SOA current which influence the working point on the characteristic.

A prototype converter based on non-linear devices according to FIG. 4 and arranged as shown in FIG. 2 was constructed to test the validity of the proposal. Only two bits were implemented. The clock and the multilevel input signals used comprised a 20 GHz pulse train and a 20 Gs/s signal respectively. A first SOA (SOA 1) pumped with a current ISOA1=239 mA was used to encode bit #1. A second SOA (SOA2) was pumped with a current ISOA2=135 mA and generated a characteristic with threshold higher than the one generated by the cascade of a fourth SOA driven with current ISOA4=351 mA and a fifth SOA driven with a current ISOA5=357 mA. These last two devices were cascaded in order to increase the steepness of the nonlinear function. Bit #2 was encoded by performing in a third SOA pumped with current SOA3=377 mA the AND between the bits at the output of SOA2 and the logically inverted bits at the output of the fifth SOA. The pump power at the SOAs input was in the range 3 to 9 dBm, while the power of the probe was in the range −20 to −11 dBm. A 4 dBm continuous wave (CW) was fed into the third SOA in order to reduce the noise on the output signal.

Figure 6A:
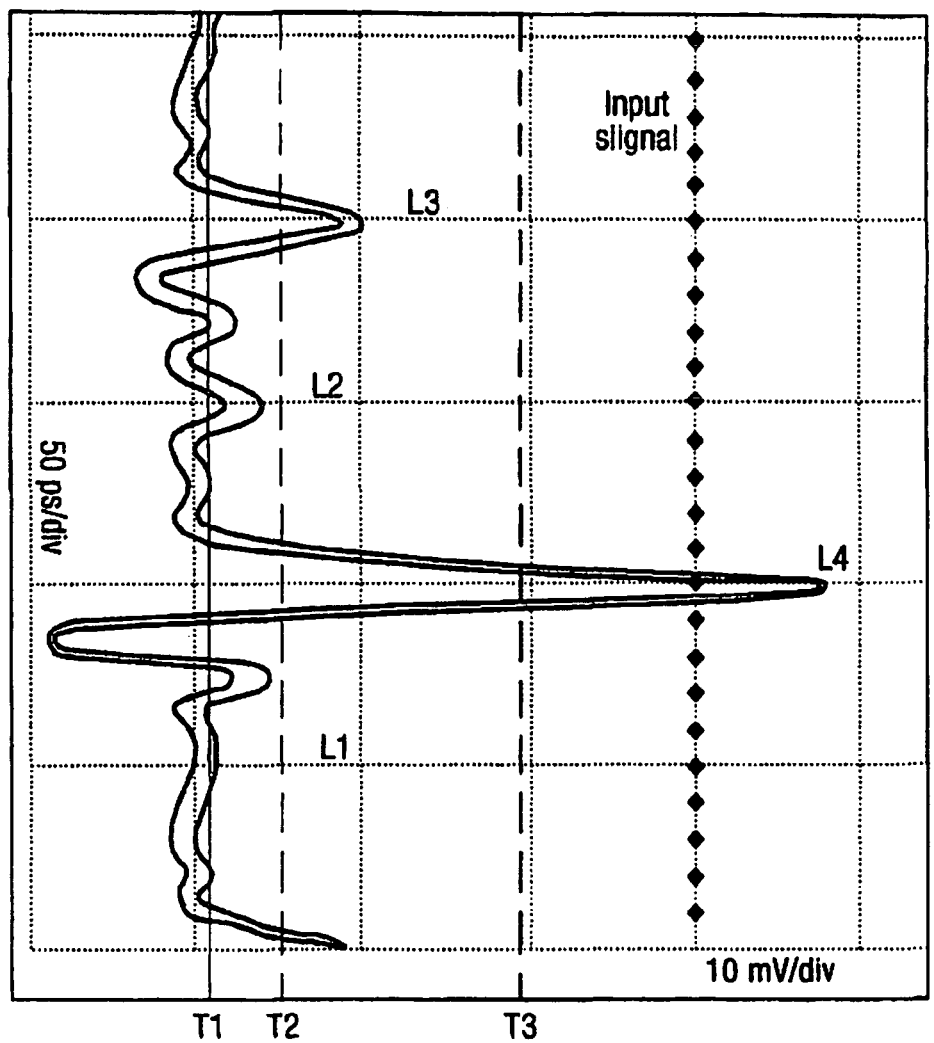

A test input signal having four levels was applied to the prototype. This signal can be seen in FIG. 6(a). The four levels range were chosen to correspond to L1,L2,L3 and L4 of the input signal and hence it would be expected that value of the digital output signal would be different for each level. Therefore as shown in FIG. 6(d) the power of pulse L3 is above threshold T2 and below T3, therefore the value of output bits #1 and #2) is (0,1) as shown in FIGS. 6(c) and (d).

The pulse L2 is below T2 and above T1, thus the output bits are (1, 1). Pulse L4 is above T3, i.e. the output is (0,0). Pulse L1 is below T1 and the output results (1,0). The experiment therefore showed that the circuit was operating as expected.

Figure 6B:
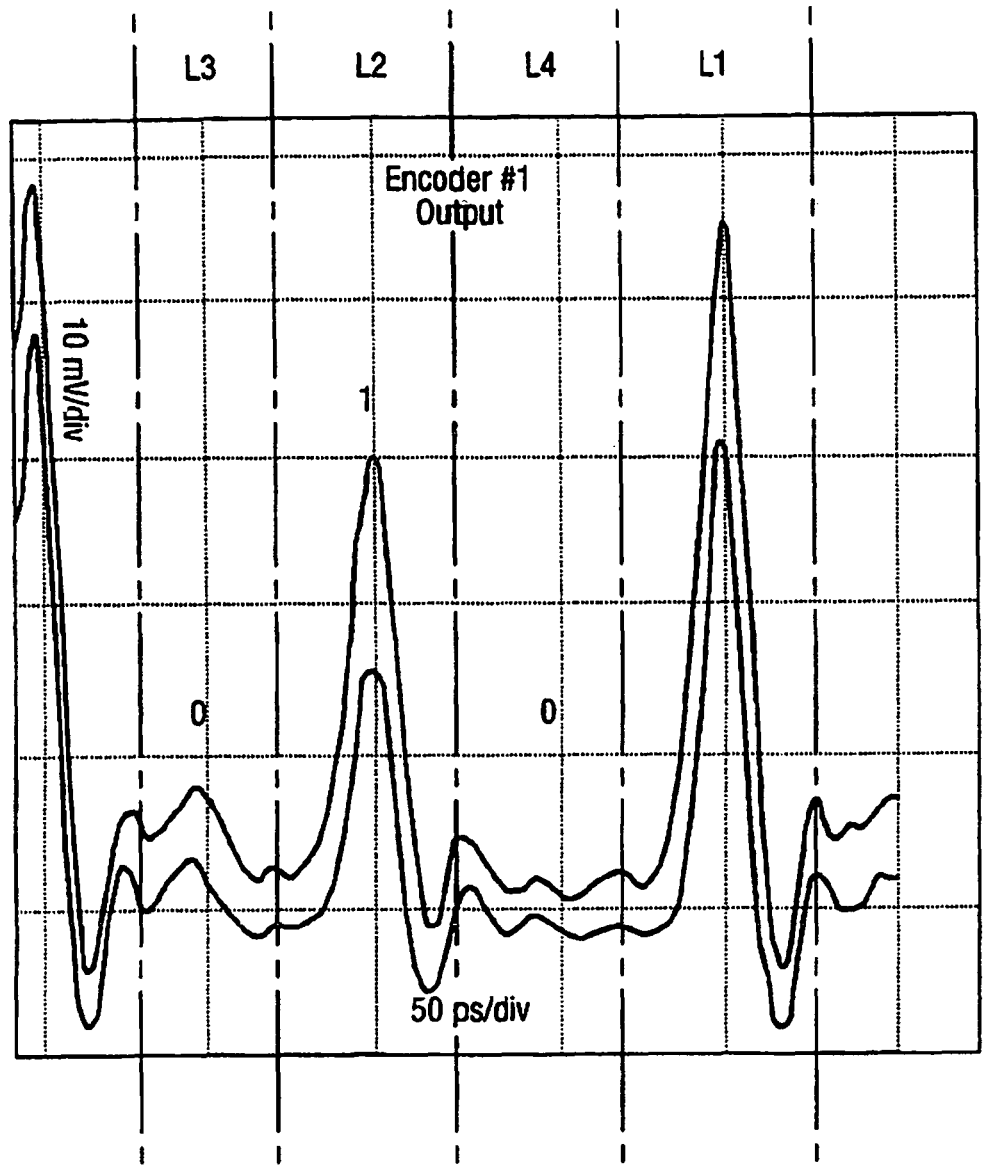
Figure 6D:
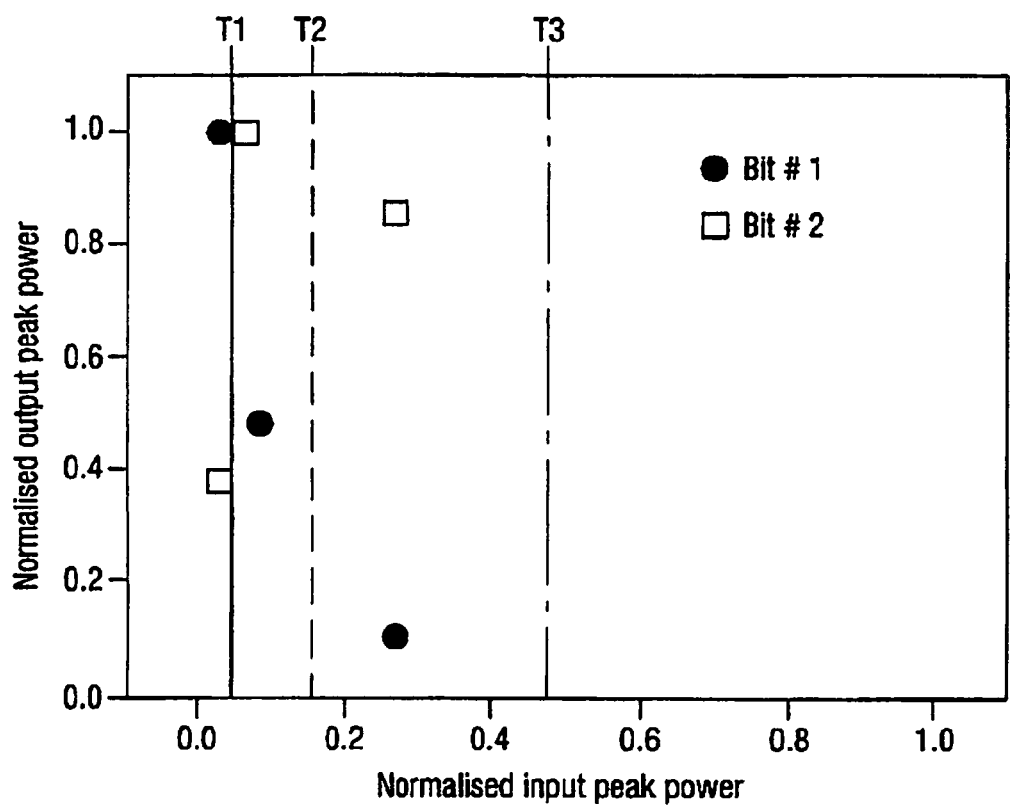

FIG. 6 (d) shows the normalised pulse peak power for bit #1 and bit #2 as a function of the normalised input peak power. The extinction ratio is 6.8 dB and 3.6 dB for the outputs of encoder #1 and encoder #2 respectively.

It is envisaged that the converter circuit of the present invention may find Widespread use in a range of applications. The main attraction of the all optical converter is the ability to work at much higher speeds than could be achieved with an optical/electrical device. For instance it may be used to scan optical signals on an optical communications network or for measuring ultrawideband optical signals. It may have general application within an all-optical signal processor.

The invention claimed is:

1. An analogue to digital converter arranged to receive and process an analogue optical input signal to produce an N bit digital optical output signal quantised to $2^N$ levels, where N is greater than or equal to 2, the converter comprising:
   an input for receiving the optical input signal;
   N processing channels which are each coupled to the input, at least one of said processing channels comprising an optical processing circuit arranged to generate a plurality of digital optical output signals dependent upon different values of the analogue optical input signal using respective different non-linear transfer functions, and
   an optical combining circuit for combining the optical output signals of the at least one of said processing channels whereby the at least one of said processing channels generates one bit of the N-bit digital optical signal.

2. An analogue to digital converter according to claim 1 wherein the non-linear transfer functions are implemented using non-linear optical effects.

3. An analogue to digital converter according to claim 1 in which the optical processing circuit of said at least one processing channel comprises a plurality of optical sub-circuits, each sub-circuit being arranged to receive at an input an optical signal dependent upon the analogue optical input signal and to provide at an output one of said plurality of digital optical output signals, each sub-circuit including an optical device having a transfer function that defines a non-linear relationship between the input signal intensity and the gain of the device such that the optical device is arranged to change the state of the digital output signal from the device when the input signal reaches a threshold intensity.

4. An analogue to digital converter according to claim 3 in which the input signal threshold about which the output of each optical sub-circuit is arranged to change state is dependent upon the attenuation level of an attenuator provided upstream of the optical device.

5. An analogue to digital converter according to claim 3 in which an optical processing circuit of a said processing channel has at least one pair of said optical sub-circuits, each sub-circuit being connected to the input signal.

6. An analogue to digital converter according to claim 1 in which the optical processing circuit of each processing channel comprises $2^N/2$ optical sub-circuits which each include an optical device, each sub-circuit arranged to provide at an output a digital optical output signal, each circuit having a non-linear relationship between the input signal intensity and the gain of the optical device whereby the sub-circuit has a threshold about which the device causes the digital output signal from that device to change state, each optical sub-circuit of a processing channel having a different threshold to any other optical sub-circuits in that processing channel.

7. An analogue to digital converter according to claim 1 in which a said processing channel corresponding to the most significant bit of the output signal comprises a single optical sub-circuit arranged to provide at an output a digital optical output signal and having a non-linear relationship between the input signal intensity and gain of the optical sub-circuit such that the sub-circuit has a threshold at which the sub-circuit is arranged to change the state of digital output signal.

8. An analogue to digital converter according to claim 1 in which at least one of said processing channels includes two or more pairs of optical sub-circuits, each having a different switching threshold T3,T1,T7,T5, each threshold corresponding to a different intensity level of the analogue input signal at which the output signal of the processing channel is arranged to change state, the output signals from each pair being input to the optical combining circuit which comprises at least two optical logic elements, each receiving the output from one of the pairs, and at least one further logic element which is arranged to receive at an input the output of two of the logic elements.

9. An analogue to digital converter according to claim 8 in which the optical logic element comprises an optical AND, NAND, OR, NOR and NOT element each formed from at least one semiconductor optical amplifier.

10. An analogue to digital converter according to claim 1 which is arranged to produce a three bit digital optical output signal and comprises three processing channels, in which the processing channels comprise:
   a first processing channel having an optical processing circuit comprising one optical sub-circuit whose output corresponds to the most significant bit of the output signal,
   a second processing channel having an optical processing circuit comprising two optical sub-circuits, each having different thresholds, and both outputting an optical signal which is passed to a respective input of an optical combining circuit comprising an optical logic gate, the output of the logic gate corresponding to the next most significant bit of the output signal, and
   a third processing channel having an optical processing circuit comprising two pairs of optical sub-circuits, each having a different threshold, and the output of both pairs being passed to an optical combining circuit which comprises a pair of optical logic gates, each connected to the outputs of a respective one of the two pairs of optical sub-circuits, the combining circuit further comprising an OR gate which combines the output of the two logic gates, the output of the OR gate corresponding to the least significant bit of the digital output signal.

11. An analogue to digital converter according to claim 10 in which each of the optical sub-circuits includes an optical device that has only a single switching threshold.

12. An analogue to digital converter according to claim 1 in which the optical combining circuit comprises at least one semi-conductor optical amplifier.

13. An analogue to digital converter according to claim 1 in which an optical splitter is provided which is arranged to receive the optical input signal from the input and splits the input signal into N optical sub-signals, each of the N processing channels being coupled to a respective one of the N processing channels.

14. An analogue to digital converter according to claim 1 in which the digital output signal represents a binary, twos complement binary or gray scale coding of the analogue optical input signal.

15. An analogue to digital converter according to claim 1, wherein at least one optical circuit comprises a semiconductor optical amplifier which serves as a non-linear device and which uses cross gain modulation to convert an input clock signal into an amplified output signal, the semiconductor optical amplifier being connected to receive a pumped optical input signal, a gain of the semiconductor optical amplifier being dependent upon intensity of the pumped optical input signal.

16. The analogue to digital converter according to claim 15, wherein the semiconductor optical amplifier is also connected to receive a continuous wavelength signal which influences saturation of the semiconductor optical amplifier.

17. An analogue to digital converter arranged to receive and process an analogue optical input signal to produce an N bit digital optical output signal quantised to $2^N$ levels, where N is greater than or equal to 2, the converter comprising:
- an input for receiving the optical input signal;
- N processing channels which are each coupled to the input, at least one of said processing channels comprising an optical processing circuit arranged to generate a plurality of digital optical output signals dependent upon different values of the analogue optical input signal using respective different non-linear transfer functions, and
- an optical combining circuit for combining the optical output signals in order to generate one bit of the N-bit digital optical signal;

wherein the non-linear transfer functions are implemented using non-linear optical effects; and;
wherein each optical circuit comprises a semiconductor optical amplifier with a threshold dependent upon an electrical current applied to the semiconductor optical amplifier.

18. An analogue to digital converter according to claim 17 in which a first end of the semiconductor optical amplifier is fed with a pump signal comprising the optical input signal, a second end of the semiconductor optical amplifier is fed with a probe signal comprising a clock signal, and the digital output of the device comprises a signal output from the first end of the semiconductor optical amplifier.

19. An analogue to digital converter according to claim 18 further including an additional common wave signal input to the second end of the semiconductor optical amplifier.

20. A method of processing an analogue optical signal to generate an N-bit digital optical signal, the method comprising:
- optically processing in N processing channels a respective input signal dependent on the analogue optical input signal,
- generating within each processing channel a plurality of digital optical output signals dependent on respective different values of the analogue optical signal using different non-linear transfer functions; and
- combining the plurality of the digital optical output signals at the at least one of said processing channels whereby the at least one of said processing channels generates one bit of the N-bit digital optical signal.

21. A method according to claim 20 wherein the generating step uses a non-linear optical effect.

\* \* \* \* \*